(12) United States Patent
Zhang et al.

(10) Patent No.: US 9,712,901 B2
(45) Date of Patent: Jul. 18, 2017

(54) INTERCONNECTION SYSTEM, APPARATUS, AND DATA TRANSMISSION METHOD

(71) Applicant: Huawei Technologies Co., Ltd., Shenzhen (CN)

(72) Inventors: Xuecang Zhang, Moscow (RU); Qinfen Hao, Beijing (CN); Yaoda Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/928,661

(22) Filed: Oct. 30, 2015

(65) Prior Publication Data

US 2016/0112780 A1    Apr. 21, 2016

Related U.S. Application Data

(63) Continuation of application No. PCT/CN2014/075694, filed on Apr. 18, 2014.

(51) Int. Cl.
*H04J 14/00* (2006.01)
*H04J 14/02* (2006.01)
(Continued)

(52) U.S. Cl.
CPC ........ *H04Q 11/0071* (2013.01); *H04L 45/74* (2013.01); *H04Q 11/0005* (2013.01);
(Continued)

(58) Field of Classification Search
None
See application file for complete search history.

(56) References Cited

U.S. PATENT DOCUMENTS 5,469,284 A * 11/1995 Haas .................. H04Q 11/0001
398/53
5,786,917 A * 7/1998 Maeno .................. G06F 13/387
370/412
(Continued)

FOREIGN PATENT DOCUMENTS

CN         1661400 A      8/2005
CN       101039528 A      9/2007
(Continued)

OTHER PUBLICATIONS

Tooley, Michael, Data Communications, 1997, 3rd Edition, p. 148-149.*

(Continued)

*Primary Examiner* — Ken N Vanderpuye
*Assistant Examiner* — Jai Lee
(74) *Attorney, Agent, or Firm* — Conley Rose, P.C.

(57) ABSTRACT

An interconnection system, an apparatus, and a data transmission method. In the interconnection system, to-be-transmitted data is converted into a data packet in an optical signal form for transmission, and a control packet corresponding to the data packet is transmitted in an electrical signal form and includes routing information of the data packet. When the control packet passes through a switching node, the switching node directly determines, according to the routing information in the control packet, a neighboring node that serves as a next hop, and opens, in the switching node, an optical path used to transmit the data packet. Because no optical-to-electrical or electrical-to-optical conversion needs to be performed on the control packet and the data packet during an entire transmission procedure, problems of an extra delay and power consumption caused by electrical-optical-electrical conversion can be reduced, thereby improving data transmission efficiency.

11 Claims, 8 Drawing Sheets

(51) Int. Cl.
*H04Q 11/00* (2006.01)
*H04L 12/741* (2013.01)

(52) U.S. Cl.
CPC ...... *H04Q 11/0066* (2013.01); *H04J 14/0201* (2013.01); *H04J 14/0267* (2013.01); *H04Q 2011/0039* (2013.01); *H04Q 2011/0058* (2013.01); *H04Q 2011/0088* (2013.01)

(56) References Cited

U.S. PATENT DOCUMENTS

| | | | |
|---|---|---|---|
| 6,545,781 B1* | 4/2003 | Chang | H04J 14/0227 370/352 |
| 6,721,315 B1* | 4/2004 | Xiong | H04L 49/254 370/389 |
| 7,224,859 B2* | 5/2007 | Hoshino | H04Q 11/0005 385/14 |
| 7,234,000 B2* | 6/2007 | McEachern | H04L 12/1868 709/232 |
| 7,532,785 B1 | 5/2009 | Beausoleil et al. | |
| 8,340,517 B2* | 12/2012 | Shacham | H04B 10/25 398/164 |
| 8,824,496 B2* | 9/2014 | Koka | H04J 14/0256 370/458 |
| 2005/0063701 A1* | 3/2005 | Ovadia | H04Q 11/0066 398/45 |
| 2005/0191004 A1 | 9/2005 | Hosino et al. | |
| 2010/0239266 A1 | 9/2010 | Kash et al. | |
| 2013/0294771 A1* | 11/2013 | McGlashan-Powell | H04B 10/801 398/45 |
| 2015/0026527 A1* | 1/2015 | Hou | H04L 1/18 714/706 |

FOREIGN PATENT DOCUMENTS

| | | | |
|---|---|---|---|
| CN | 102281478 A | 12/2011 | |
| CN | 102629898 A * | 8/2012 | H04L 1/18 |
| CN | 103490820 A | 1/2014 | |

OTHER PUBLICATIONS

Mehdi, Von Neumann Architecture, 2012, http://www2.cs.siu.edu/~cs401/Textbook/ch2.pdf.*
Xingyun, Q., et al., "BOIN: A Novel Bufferless Optical Interconnection Network for High Performance Computer," Computer Systems and Applications, May 10, 2009, pp. 117-123.
Xingyun, Q., et al., "A Fault Tolerant Bufferless Optical Interconnection Network," 2009 Eight IEEE/ACIS International Conference on Computer and Information Science, Jun. 2009, pp. 249-254.
Foreign Communication From a Counterpart Application, European Application No. 14889630.1, Extended European Search Report dated Apr. 21, 2016, 11 pages.
Partial English Translation and Abstract of Chinese Patent Application No. CN101039528, Feb. 1, 2016, 7 pages.
Vantrease, D., et al., "Corona: System Implications of Emerging Nanophotonic Technology," International Symposium on Computer Architecture, IEEE Computer Society, 35th International Symposium on Computer Architecture, Jun. 21-25, 2008, pp. 153-164.
Shacham, A., et al., "On the Design of a Photonic Network-on-Chip," NOCS Proceedings of the First International Symposium on Networks-on-Chip, 2007, 12 pages.
Xing-Yun, Q., et al., "Analysis and Optimization of Delay Performance of Bufferless Optical Interconnection Network," Computer Engineering, vol. 36, No. 5, Mar. 2010, pp. 12-14.
English Translation of Xing-Yun, Q., et al., "Analysis and Optimization of Delay Performance of Bufferless Optical Interconnection Network," Computer Engineering, vol. 36, No. 5, Mar. 2010, 7 pages.
Foreign Communication From a Counterpart Application, PCT Application No. PCT/CN2014/075694, English Translation of International Search Report dated Jan. 23, 2015, 4 pages.

* cited by examiner

INTERCONNECTION SYSTEM, APPARATUS, AND DATA TRANSMISSION METHOD

CROSS-REFERENCE TO RELATED APPLICATIONS

This application is a continuation of International Application No. PCT/CN2014/075694, filed on Apr. 18, 2014, which is hereby incorporated by reference in its entirety.

TECHNICAL FIELD

The present disclosure relates to the field of computer technologies, and in particular, to an interconnection system, an apparatus, and a data transmission method.

BACKGROUND

Optical interconnection is an optical signal transmission manner using an optical waveguide (such as an optical fiber) as a transmission medium, and has advantages of low power consumption, low delay and large bandwidth.

When data is transmitted based on traditional optical interconnection, an interface controller converts data in an electrical signal form sent by an interconnection endpoint in an optical interconnection network into data in an optical signal form, and sends the data in an optical signal form to a switching node connected to the interface controller. The optical signal is routed hop by hop by switching nodes in the optical interconnection network to an interface controller connected to another interconnection endpoint, and the optical signal is converted into an electrical signal and sent to the other interconnection endpoint.

However, the data in an optical signal form cannot be parsed directly, and information included in the data can be obtained using parsing only after the data in an optical signal form is converted into data in an electrical signal form. Therefore, each switching node on a transmission path needs to first perform an optical-to-electrical conversion on received data in an optical signal form, and obtain routing information from converted data in an electrical signal form. Each switching node on a transmission path also needs to perform routing according to the routing information to determine a next hop, and then perform an electrical-to-optical conversion on the data in an electrical signal form and sends converted data in an optical signal form to the next hop. Therefore, there are problems of an extra delay and power consumption caused by an electrical-to-optical conversion.

SUMMARY

The present disclosure provides an interconnection system, an apparatus, and a data transmission method, so as to improve data transmission efficiency.

According to a first aspect, an interconnection system is provided, where the interconnection system includes at least two interconnection endpoints, at least two interface controllers and N switching nodes, where N is a positive integer. A first interconnection endpoint of the interconnection endpoints is connected to a first switching node of the N switching nodes using a first interface controller of the interface controllers, and a second interconnection endpoint of the interconnection endpoints is connected to a second switching node of the N switching nodes using a second interface controller of the interface controllers. The first interconnection endpoint is configured to send data in an electrical signal form to the first interface controller. The first interface controller is configured to convert the received data in an electrical signal form into a data packet in an optical signal form, and generate a control packet for the data packet, where the control packet is in an electrical signal form and includes routing information of the data packet. The first interface controller is further configured to send the control packet to the first switching node, and send the data packet to the first switching node after an offset time. Any one switching node of the N switching nodes is configured to determine, when receiving the control packet sent by a first neighboring node, a second neighboring node according to the routing information of the data packet. The first neighboring node is a switching node adjacent to the any one switching node, or an interface controller connected to the any one switching node, and the second neighboring node is a switching node adjacent to the any one switching node, or an interface controller connected to the any one switching node. Any one switching node of the N switching nodes is further configured to, when the second neighboring node is the switching node, send the control packet to the second neighboring node. Any one switching node of the N switching nodes is further configured to open, in the any one switching node, an optical path from a first optical port connected to the first neighboring node to a second optical port connected to the second neighboring node, for the data packet. When receiving the data packet using the first optical port, any one switching node of the N switching nodes is further configured to transmit the data packet using the optical path to the second optical port, and send the data packet to the second neighboring node using the second optical port. The second interface controller is configured to convert, when receiving the data packet sent by the second switching node, the data packet into data in an electrical signal form, and send the data in an electrical signal form to the second interconnection endpoint.

In a first possible implementation manner of the first aspect, the first interface controller is configured to perform, when determining that the data in an electrical signal form meets a preset condition, the operation of converting the data into the data packet in an optical signal form and generating the control packet.

With reference to the first possible implementation manner of the first aspect, in a second possible implementation manner, determining that the data in an electrical signal form meets a preset condition includes determining that a type of the data in an electrical signal form is a preset type. Alternatively, determining that the data in an electrical signal form meets a preset condition includes determining that the data in an electrical signal form is greater than a preset threshold. Alternatively, determining that the data in an electrical signal form meets a preset condition includes determining that a type of the data in an electrical signal form is a preset type and the data in an electrical signal form is greater than a preset threshold.

In a third possible implementation manner of the first aspect, the any one switching node is further configured to, when receiving a packet in an electrical signal form sent by the first neighboring node, determine whether the packet in an electrical signal form is a control packet according to information that is in the packet in an electrical signal form and used to indicate a packet type. When it is determined that the packet in an electrical signal form is a control packet, perform the operation of opening the optical path for the data packet in an optical signal form corresponding to the control packet.

With reference to the first aspect and any one of the first to the third possible implementation manners of the first aspect, in a fourth possible implementation manner, each interconnection endpoint of the at least two interconnection endpoints is a processor or a memory.

With reference to the fourth possible implementation manner of the first aspect, in a fifth possible implementation manner, the routing information of the data packet includes a destination address of the data packet. In addition, determining a second neighboring node according to the routing information of the data packet includes determining, according to the destination address, whether a destination of the data packet in an optical signal form is an interconnection endpoint connected to the any one switching node using an interface controller. If it is, it is determined that the interface controller is the second neighboring node; otherwise, it is determined, according to a routing algorithm, that a neighboring switching node that serves as a candidate next hop. If an optical port of the any one switching node and connected to the neighboring switching node that serves as the candidate next hop is not occupied, it is determined that the neighboring switching node is the second neighboring node. If optical ports of the any one switching node and connected to all neighboring switching nodes that serve as candidate next hops are all occupied, when it is determined that there is an idle memory connected to the any one switching node using an interface controller, it is determined that the interface controller is the second neighboring node.

According to a second aspect, a switching node is provided, including a routing module and an optical switch module, where the routing module is configured to determine, when receiving a control packet in an electrical signal form sent by a first neighboring node, a second neighboring node according to routing information in the control packet. The routing information in the control packet is routing information of a data packet in an optical signal form corresponding to the control packet. The first neighboring node is a switching node adjacent to the switching node or an interface controller connected to the switching node. The second neighboring node is a switching node adjacent to the switching node or an interface controller connected to the switching node. The second neighboring node is further configured to, when the second neighboring node is the switching node, send the control packet to the second neighboring node. The second neighboring node is further configured to instruct the optical switch module to open an optical path from a first optical port of the switching node to a second optical port of the switching node, for the data packet in an optical signal form corresponding to the control packet. The first optical port of the switching node is connected to an optical port of the first neighboring node, and the second optical port of the switching node is connected to an optical port of the second neighboring node. The optical switch module is configured to open the optical path according to an instruction of the routing module, and configured to, when receiving the data packet using the first optical port, transmit the data packet to the second optical port using the optical path, and send the data packet to the second neighboring node using the second optical port.

In a first possible implementation manner of the second aspect, the routing module is further configured to, when receiving a packet in an electrical signal form sent by the first neighboring node, determine whether the packet in an electrical signal form is a control packet according to information that is in the packet in an electrical signal form and used to indicate a packet type. When it is determined that the packet in an electrical signal form is a control packet, instruct the optical switch module to open the optical path for the data packet in an optical signal form corresponding to the control packet.

With reference to the second aspect or the first possible implementation manner of the second aspect, in a second possible implementation manner, the interconnection endpoint is a processor or a memory, the routing information of the data packet includes a destination address of the data packet. In addition, determining a second neighboring node according to the routing information of the data packet includes determining, according to the destination address, whether a destination of the data packet in an optical signal form is an interconnection endpoint connected to the switching node using an interface controller. If so, it is determined that the interface controller is the second neighboring node; otherwise, it is determined, according to a routing algorithm, that a neighboring switching node that serves as a candidate next hop. If an optical port of the switching node and connected to the neighboring switching node that serves as the candidate next hop is not occupied, it is determined that the neighboring switching node is the second neighboring node. If optical ports of the switching node and connected to all neighboring switching nodes that serve as candidate next hops are all occupied, when it is determined that there is an idle memory connected to the switching node using an interface controller, it is determined that the interface controller is the second neighboring node.

According to a third aspect, an interface controller is provided, including a receiving unit and a processing unit. The receiving unit is configured to receive data in an electrical signal form sent by an interconnection endpoint connected to the interface controller, and transmit the received data to the processing unit. The processing unit is configured to receive the data from the receiving unit, convert the data into a data packet in an optical signal form, and generate a control packet for the data packet. The control packet is in an electrical signal form and includes routing information of the data packet. The processing unit is further configured to send the control packet to a switching node connected to the interface controller, and send the data packet to the switching node after an offset time. By doing so, when receiving the control packet and determining a next hop according to the routing information of the data packet included in the control packet, the switching node opens, in the switching node, an optical path that is from an optical port connected to the interface controller to an optical port connected to the next hop and that is used to transmit the data packet. When receiving the data packet in an optical signal form, the switching node transmits the data packet in an optical signal form using the optical path.

In a first possible implementation manner of the third aspect, the processing unit is configured to perform, when determining that the data in an electrical signal form meets a preset condition, the operation of converting the data into the data packet in an optical signal form and generating the control packet.

With reference to the first possible implementation manner of the third aspect, in a second possible implementation manner, the processing unit is configured to perform, when determining that a type of the data in an electrical signal form is a preset type, or determining that the data in an electrical signal form is greater than a preset threshold, or determining that a type of the data in an electrical signal form is a preset type and the data in an electrical signal form is greater than a preset threshold, the operation of converting the data into the data packet in an optical signal form and generating the control packet.

According to a fourth aspect, a switching node is provided, including a processor, a memory, and an optical switch. The memory is configured to store a computer operation instruction. The processor is configured to execute the computer operation instruction stored in the memory to enable the switching node to implement the following operations: when receiving a control packet in an electrical signal form sent by a first neighboring node, determining a second neighboring node according to routing information in the control packet. The routing information in the control packet is routing information of a data packet in an optical signal form corresponding to the control packet, the first neighboring node is a switching node adjacent to the switching node, or an interface controller connected to the switching node. The second neighboring node is a switching node adjacent to the switching node, or an interface controller connected to the switching node. The operations include sending the control packet to the second neighboring node, and opening an optical path from a first optical port of the optical switch to a second optical port of the optical switch, where the first optical port of the optical switch is connected to an optical port of the first neighboring node. The second optical port of the optical switch is connected to an optical port of the second neighboring node. The optical switch is configured to, when receiving the data packet using the first optical port, transmit the data packet to the second optical port using the optical path, and send the data packet to the second neighboring node using the second optical port.

In a first possible implementation manner of the fourth aspect, the interconnection endpoint is a processor or a memory, the routing information of the data packet includes a destination address of the data packet. The executing, by the processor, the computer operation instruction enables the switching node to implement the following operations: determining, according to the destination address, whether a destination of the data packet in an optical signal form is an interconnection endpoint connected to the switching node using an interface controller. If so, it is determined that the interface controller is the second neighboring node; otherwise, it is determined, according to a routing algorithm, that a neighboring switching node that serves as a candidate next hop. If an optical port of the switching node and connected to the neighboring switching node that serves as the candidate next hop is not occupied, it is determined that the neighboring switching node is the second neighboring node. If optical ports of the switching node and connected to all neighboring switching nodes that serve as candidate next hops are all occupied, when determining that there is an idle memory connected to the switching node using an interface controller, it is determined that the interface controller is the second neighboring node.

With reference to the fourth aspect or the first possible implementation manner of the fourth aspect, in a second possible implementation manner, the executing, by the processor, the computer operation instruction further enables the switching node to implement the following operations: when receiving a packet in an electrical signal form sent by the first neighboring node, determine whether the packet in an electrical signal form is a control packet according to information that is in the packet in an electrical signal form and used to indicate a packet type. When it is determined that the packet in an electrical signal form is a control packet, open the optical path for the data packet in an optical signal form corresponding to the control packet.

According to a fifth aspect, an interface controller is provided, including a processor and a memory, where the memory is configured to store a computer operation instruction. The processor is configured to execute the computer operation instruction stored in the memory to enable the interface controller to implement the following operations: when receiving data in an electrical signal form sent by an interconnection endpoint connected to the interface controller, converting the data into a data packet in an optical signal form, and generating a control packet for the data packet. The control packet is in an electrical signal form and includes routing information of the data packet. The operations include sending the control packet to a switching node connected to the interface controller. The operations also include sending the data packet to the switching node after an offset time, such that when receiving the control packet and determining a next hop according to the routing information of the data packet included in the control packet, the switching node opens, in the switching node, an optical path that is from an optical port connected to the interface controller to an optical port connected to the next hop and that is used to transmit the data packet. When receiving the data packet in an optical signal form, transmits the data packet in an optical signal form using the optical path.

In a first possible implementation manner of the fifth aspect, the executing, by the processor, the computer operation instruction enables the interface controller to implement the following operation: when determining that the data in an electrical signal form meets a preset condition, performing the operation of converting the data into the data packet in an optical signal form and generating the control packet.

With reference to the first possible implementation manner of the fifth aspect, in a second possible implementation manner, the executing, by the processor, the computer operation instruction enables the interface controller to implement the following operation: when determining that a type of the data in an electrical signal form is a preset type, or determining that the data in an electrical signal form is greater than a preset threshold, or determining that a type of the data in an electrical signal form is a preset type and the data in an electrical signal form is greater than a preset threshold, performing the operation of converting the data into the data packet in an optical signal form and generating the control packet.

According to a sixth aspect, an access switching node is provided, including the interface controller implemented according to the third aspect or the first or the second possible implementation manner of the third aspect, or the interface controller implemented according to the fifth aspect or the first or the second possible implementation manner of the fifth aspect. The access switching node also includes switching node implemented according to the second aspect or the first or the second possible implementation manner of the second aspect, or the switching node implemented according to the fourth aspect or the first or the second possible implementation manner of the fourth aspect.

According to a seventh aspect, an access interconnection endpoint is provided, including an interconnection endpoint. The interface controller implemented according to the third aspect or the first or the second possible implementation manner of the third aspect, or the interface controller implemented according to the fifth aspect or the first or the second possible implementation manner of the fifth aspect.

According to an eighth aspect, a data transmission method is provided, including, when receiving a control packet in an electrical signal form sent by a first neighboring node, determining, by a switching node, a second neighboring node according to routing information in the control packet, where the routing information in the control packet is routing information of a data packet in an optical signal form corresponding to the control packet, the first neighboring node is a switching node adjacent to the switching node, or an interface controller connected to the switching node. The second neighboring node is a switching node adjacent to the switching node, or an interface controller connected to the switching node. The operations include sending, by the switching node, the control packet to the second neighboring node; opening, by the switching node and in the switching node, an optical path from a first optical port connected to the first neighboring node to a second optical port connected to the second neighboring node, for the data packet corresponding to the control packet. When receiving the data packet using the first optical port, transmitting, by the switching node, the data packet to the second optical port using the optical path, and sending the data packet to the second neighboring node using the second optical port.

In a first possible implementation manner of the eighth aspect, the method further includes, when receiving a packet in an electrical signal form sent by the first neighboring node, determining, by the switching node, whether the packet in an electrical signal form is a control packet according to information that is in the packet in an electrical signal form and used to indicate a packet type. When it is determined that the packet in an electrical signal form is a control packet, performing the operation of opening the optical path for the data packet in an optical signal form corresponding to the control packet.

With reference to the eighth aspect or the first possible implementation manner of the eighth aspect, in a second possible implementation manner, the interconnection endpoint is a processor or a memory, the routing information of the data packet includes a destination address of the data packet. Determining a second neighboring node according to the routing information of the data packet includes determining, according to the destination address, whether a destination of the data packet in an optical signal form is an interconnection endpoint connected to the switching node using an interface controller. If so, it is determined that the interface controller is the second neighboring node; otherwise, it is determined, according to a routing algorithm, a neighboring switching node that serves as a candidate next hop. If an optical port of the switching node and connected to the neighboring switching node that serves as the candidate next hop is not occupied, it is determined that the neighboring switching node is the second neighboring node. If optical ports of the switching node and connected to all neighboring switching nodes that serve as candidate next hops are all occupied, when it is determined that there is an idle memory connected to the switching node using an interface controller, it is determined that the interface controller is the second neighboring node.

According to a ninth aspect, a data transmission method is provided, including receiving, by an interface controller, data in an electrical signal form sent by an interconnection endpoint connected to the interface controller. The method includes converting, by the interface controller, the data into a data packet in an optical signal form, and generating a control packet for the data packet, where the control packet is in an electrical signal form and includes routing information of the data packet. The method includes sending, by the interface controller, the control packet to a switching node connected to the interface controller. The method includes sending the data packet to the switching node after an offset time, such that when receiving the control packet and determining a next hop according to the routing information of the data packet included in the control packet, the switching node opens, in the switching node, an optical path that is from an optical port connected to the interface controller to an optical port connected to the next hop and that is used to transmit the data packet. When receiving the data packet in an optical signal form, the method includes transmits the data packet in an optical signal form using the optical path.

In a first possible implementation manner of the ninth aspect, the interface controller performs, when determining that the data in an electrical signal form meets a preset condition, the operation of converting the data into the data packet in an optical signal form and generating the control packet.

With reference to the first possible implementation manner of the ninth aspect, in a second possible implementation manner, the determining that the data in an electrical signal form meets a preset condition includes determining that a type of the data in an electrical signal form is a preset type, or determining that the data in an electrical signal form is greater than a preset threshold, or determining that a type of the data in an electrical signal form is a preset type and the data in an electrical signal form is greater than a preset threshold.

According to the embodiments of the present disclosure, to-be-transmitted data is converted into a data packet in an optical signal form for transmission, where a control packet corresponding to the data packet is transmitted in an electrical signal form and includes routing information of the data packet. When the control packet passes through a switching node, the switching node directly determines, according to the routing information in the control packet, a neighboring node that serves as a next hop, and opens, in the switching node, an optical path used to transmit the data packet for transmitting the data packet. Because no optical-to-electrical or electrical-to-optical conversion needs to be performed on the control packet and the data packet during an entire transmission procedure, problems of an extra delay and power consumption caused by electrical-optical-electrical conversion can be reduced, thereby improving data transmission efficiency.

BRIEF DESCRIPTION OF DRAWINGS

To describe the technical solutions in the embodiments of the present disclosure more clearly, the following briefly introduces the accompanying drawings required for describing the embodiments. The accompanying drawings in the following description show merely some embodiments of the present disclosure, and a person of ordinary skill in the art may still derive other drawings from these accompanying drawings without creative efforts.

FIG. 6-1 and FIG. 6-2 are schematic structural diagrams of an optical switch of a switching node 200 according to Embodiment 2 of the present disclosure;

DESCRIPTION OF EMBODIMENTS

To make the objectives, technical solutions, and advantages of the present disclosure clearer, the following further describes the embodiments of the present disclosure in detail with reference to the accompanying drawings.

Figure 1:
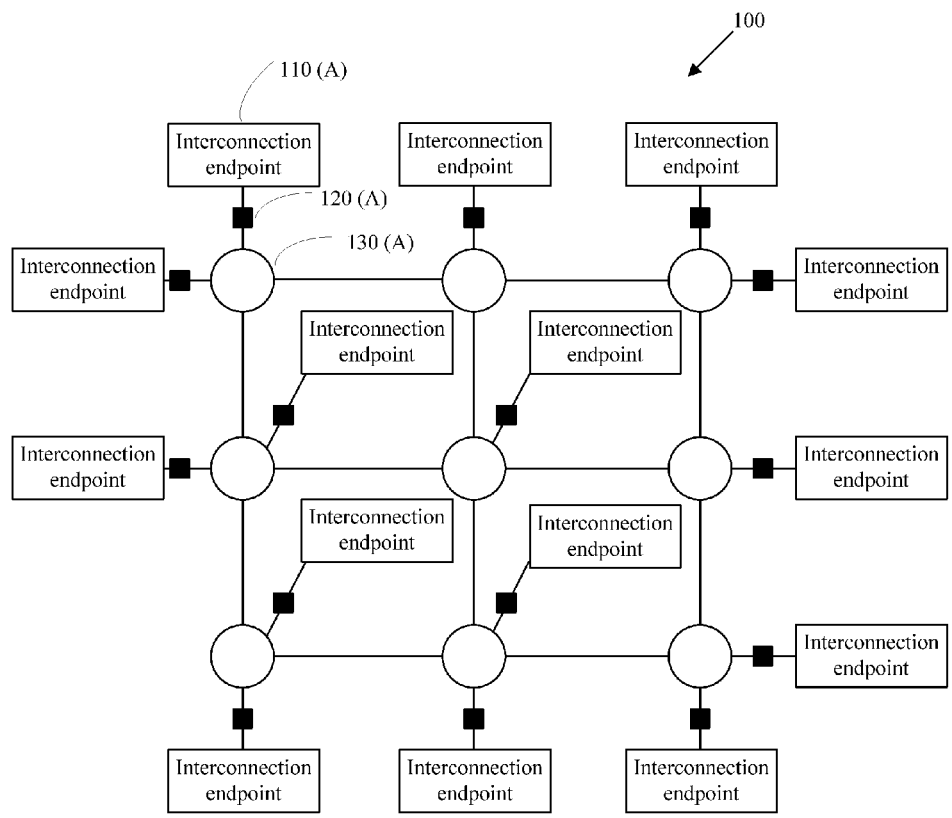
FIG. 1 is a schematic structural diagram of an interconnection system 100 according to Embodiment 1 of the present disclosure.

FIG. 1 is a schematic structural diagram of an interconnection system 100 according to Embodiment 1 of the present disclosure. The interconnection system 100 includes an interconnection endpoint 110, an interface controller 120, and a switching node 130.

Figure 2A:
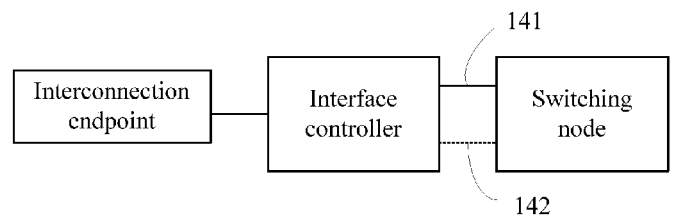
FIG. 2A is a schematic diagram of a manner of connection among an interconnection endpoint, an interface controller, and a switching node in an interconnection system according to Embodiment 1 of the present disclosure.

An interconnection endpoint (such as 110 (A) shown in FIG. 1) is connected to a corresponding switching node (such as a switching node 130 (A) shown in FIG. 1) using a corresponding interface controller (such as 120 (A) shown in FIG. 1). A connection manner may be shown in FIG. 2A, where an electrical port of the interconnection endpoint and an electrical port of the interface controller are connected using an electrical interconnection cable 141. The other electrical port of the interface controller and an electrical port of the switching node are connected using the electrical interconnection cable 141, and an optical port of the interface controller and an optical port of the switching node are connected using an optical waveguide 142. In an implementation, the interconnection endpoint, the interface controller and the switching node shown in FIG. 2A may be implemented separately on different physical entities, or the interconnection endpoint and the interface controller may be integrated, or the interface controller and the switching node may be integrated.

Figure 2B:
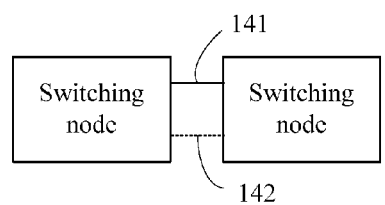
FIG. 2B is a schematic diagram of a manner of connection between switching nodes in an interconnection system according to Embodiment 1 of the present disclosure.

As shown in FIG. 2B, electrical ports of neighboring switching nodes in the interconnection system 100 are connected using the electrical interconnection cable 141, and optical ports of the neighboring switching nodes are connected using the optical waveguide 142.

The electrical interconnection cable 141 in the interconnection system 100 is used to transmit an electrical signal and may be a copper wire, a nanowire, or the like. The optical waveguide 142 is used to transmit an optical signal and may be a light-guide fiber (such as an optical fiber and an optical cable), a thin film optical waveguide, a strip waveguide, or the like.

On the whole, switching nodes in the interconnection system 100 are connected using the electrical interconnection cable 141 in a network topology structure, such as a mesh topology structure and a torus topology structure. The switching nodes and the electrical interconnection cable connecting the switching nodes form an electrical network as a whole. The switching nodes are connected using the optical waveguide in a network topology structure, such as a mesh topology structure and a torus topology structure, and the switching nodes and the optical waveguide connecting the switching nodes form an optical network as a whole. The network topology structure of the electrical network and the network topology of the optical network may be the same or different.

The interconnection system 100 may be an inter-board interconnection system, and correspondingly, the interconnection endpoint 110 is a server, or the like.

Figure 3:
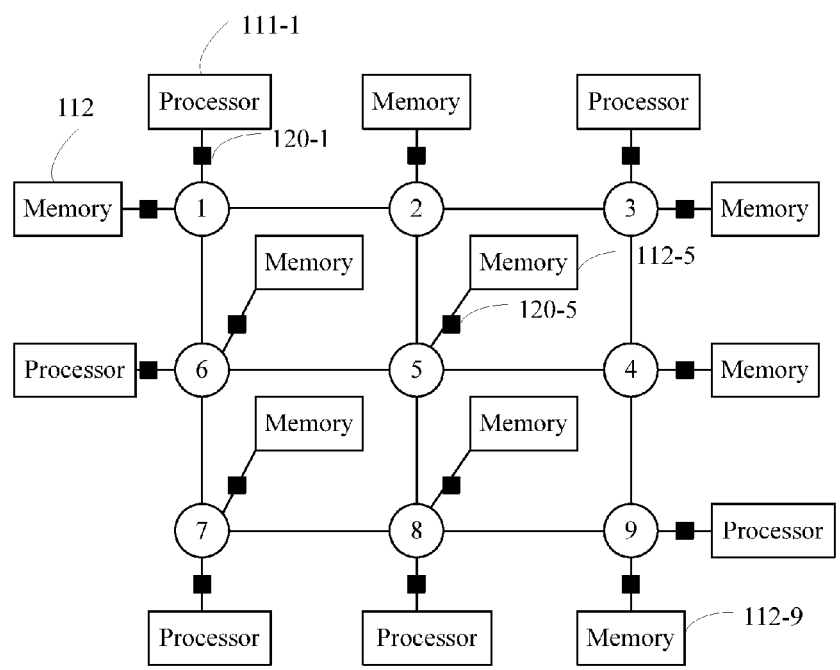
FIG. 3 is another schematic structural diagram of an interconnection system 100 according to Embodiment 1 of the present disclosure.

The interconnection system 100 may also be an inter-chip interconnection system, as shown in FIG. 3, and correspondingly, the interconnection endpoint 110 is a processor 111 or a memory 112.

The processor 111 may be a central processing unit (CPU), an application specific integrated circuit (ASIC), or the like.

The memory 112 may be a high-speed random access memory (RAM) memory, a non-volatile memory, or the like.

An implementation of the interconnection endpoint, the interface controller and the switching node in the interconnection system 100 is described below with reference to FIG. 3.

A first interconnection endpoint (such as 111-1) in interconnection endpoints 110 is connected to a first switching node (such as a switching node 1) in switching nodes 130 using a first interface controller (such as 120-1) in interface controllers 120.

A second interconnection endpoint (such as 112-5) in the interconnection endpoints 110 is connected to a second switching node (such as a switching node 5) in the switching nodes 130 using a second interface controller (such as 120-5) in the interface controllers 120. The second switching node and the first switching node may be the same or different.

The first interconnection endpoint is configured to send data in an electrical signal form to the first interface controller.

For example, the first interconnection endpoint is a processor that needs to transmit data to another processor in the interconnection system 100 or write data into a memory in the interconnection system 100 (for example, the processor 111-1 needs to write data into the memory 112-5). For another example, the first interconnection endpoint is a memory, and if a processor in the interconnection system 100 reads data from the memory, the first interconnection endpoint first sends the data to the first interface controller.

The first interface controller is configured to convert the received data in an electrical signal form into a data packet in an optical signal form, and generate a control packet for the data packet in an optical signal form, where the control packet is in an electrical signal form and includes routing information of the data packet. The first interface controller is further configured to send the control packet to the first switching node, and send the data packet to the first switching node after an offset time.

The offset time may be determined according to an empirical value, test data or the like, provided that the determined offset time can ensure that the data packet in an optical signal form corresponding to the control packet reaches a same switching node a little later than the control packet.

The routing information includes a destination address of the data packet, and may also include a priority or other information of the data packet.

An implementation of converting the data in an electrical signal form into a data packet in an optical signal form may be encapsulating the data in an electrical signal form into a data packet in an electrical signal form, and converting the data packet in an electrical signal form into the data packet in an optical signal form by means of electrical-to-optical conversion.

When an optical burst switching (OBS) technology is used to implement data transmission in Embodiment 1 of the present disclosure, the data packet is a burst packet.

The converted data packet may be one or more data packets, and the first interface controller may generate a corresponding control packet for each data packet.

Each time when the first interface controller receives data in an electrical signal form sent by the first interconnection endpoint, the first interface controller may convert the data in an electrical signal form into a data packet in an optical signal form, generate a control packet corresponding to the data packet, and send the control packet to the first switching node, regardless of an attribute of the data (such as a data type and size).

The first interface controller may also determine, when receiving the data in an electrical signal form from the first interconnection endpoint, whether the data meets a preset condition. When determining that the data meets the preset condition, perform the operation of converting the data into a data packet in an optical signal form and generating a corresponding control packet, and may directly transmit the data that does not meet the preset condition to the first switching node using an electrical interconnection cable connected to the first switching node.

A determining method may be determining whether a type of the data is a preset type. If the type of the data is the preset type, performing the operation of converting the data into a data packet in an optical signal form and generating a corresponding control packet. For example, electrical interconnection cables between an interconnection endpoint and an interface controller generally include multiple pin cables, such as a data cable, an address cable, a control cable, a power cable, and a clock cable; data of different types is transmitted using different pin cables, for example, a control signal is transmitted using the control cable. The first interface controller may determine the type of the data according to a pin cable that transmits the data, and further determine whether the data is data of the preset type. If so, the first interface controller performs the operation of converting the data into a data packet in an optical signal form and generating a corresponding control packet.

The determining method may also be determining whether the data is greater than a preset threshold. If yes, performing the operation of converting the data into a data packet in an optical signal form and generating a corresponding control packet.

In an implementation, a type and a size of the data can also be considered to perform comprehensive determining. For example, it is determined whether the type of the data is the preset type and whether the data is greater than the preset threshold. If the type of the data is the preset type and the data is greater than the preset threshold, the operation of converting the data into a data packet in an optical signal form and generating a corresponding control packet is performed.

Any one switching node (such as the switching node 1 or a switching node 2, referred to as a current switching node hereinafter for ease of description) in the switching nodes 130 is configured to determine, when receiving the control packet sent by a first neighboring node, a second neighboring node according to the routing information (such as a destination address and a priority of the data packet) of the data packet included in the control packet. The first neighboring node is a switching node adjacent to the current switching node or an interface controller connected to the current switching node. The second neighboring node is a switching node adjacent to the current switching node or an interface controller connected to the current switching node. The second neighboring node is further configured to, when the second neighboring node is the switching node adjacent to the current switching node, send the control packet to the second neighboring node. The second neighboring node is further configured to open, in the switching node, an optical path from a first optical port connected to the first neighboring node to a second optical port connected to the second neighboring node, for the data packet corresponding to the control packet. When receiving the data packet using the first optical port, the second neighboring node is further configured to transmit the data packet to the second optical port using the optical path, and send the data packet to the second neighboring node using the second optical port.

Figure 4:
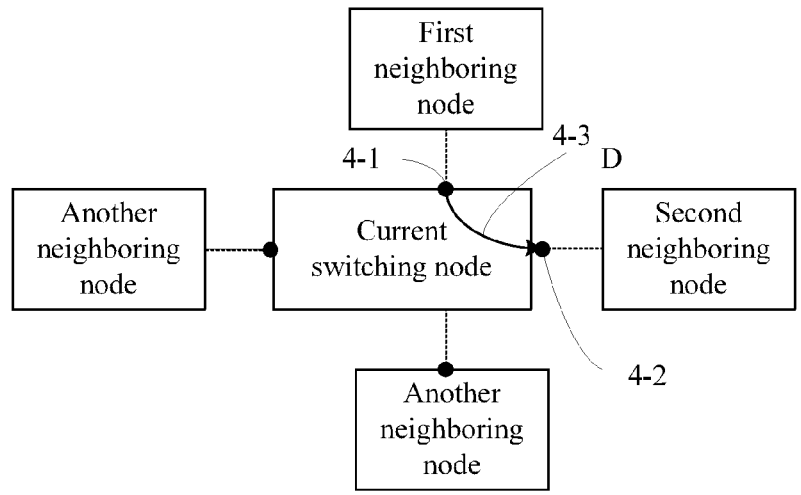
FIG. 4 is a schematic diagram of an optical path opened in a switching node according to Embodiment 1 of the present disclosure.

As shown in FIG. 4, 4-1 is the first optical port, 4-2 is the second optical port, and 4-3 is the optical path opened from the first optical port to the second optical port.

When determining the second neighboring node, the current switching node may determine, according to a routing algorithm, a neighboring switching node that serves as a candidate next hop. The current switching node determines whether an optical port of the current switching node and connected to the neighboring switching node is in an idle state, and when the current switching node determines that the optical port is in an idle state, the current switching node determines that the switching node is the second neighboring node, and sets the state of the optical port to an occupied state. Correspondingly, the current switching node is further configured to set the state of the optical port to an idle state again after sending the data packet in an optical signal form.

It should be noted that, when the second neighboring node is the interface controller connected to the current switching node, instead of the switching node adjacent to the current switching node, the current switching node may send the control packet to the interface controller, or discard the control packet directly. If the current switching node sends the control packet to the interface controller, the interface controller may directly discard the control packet when determining that the received packet is a control packet.

In an implementation, packets in an electrical signal form transmitted between nodes (including the interface controller and the switching node) may all be control packets and may also include both a control packet and a packet of another type. Preferably, when receiving a packet in an electrical signal form from the first neighboring node, the current switching node may further determine whether the packet is a control packet according to information in the packet and used to indicate a packet type, and perform the operation of opening an optical path for a data packet corresponding to the control packet when it is determined that the packet is a control packet.

When the interconnection system 100 is an inter-chip interconnection system, if a switching node in the interconnection system is connected to a memory using an interface controller, the switching node may use the connected memory as a buffer for the switching node. Correspondingly, when a next hop is determined, if optical ports of the switching node and connected to all neighboring switching nodes that serve as candidate next hops are all occupied, a to-be-transmitted data packet may be stored into the memory using the interface controller (that is, the interface controller is used as a next hop).

An implementation manner for determining, by the current switching node, a second neighboring node according to the routing information in the control packet is determining, according to the destination address of the data packet included in the control packet, whether a destination of the data packet corresponding to the control packet is an interconnection endpoint connected to the switching node using an interface controller. If so, it is determined that the interface controller is the second neighboring node; otherwise, it is determined, according to the routing algorithm, that a neighboring switching node that serves as a candidate next hop. If an optical port of the switching node and connected to the neighboring switching node that serves as the candidate next hop is not occupied (that is, in an idle state), it is determined that the neighboring switching node is the second neighboring node. If the optical ports of the switching node and connected to all neighboring switching nodes that serve as the candidate next hops are all occupied (that is, all are in an occupied state), when it is determined that there is an idle memory connected to the switching node using an interface controller, it is determined that the interface controller is the second neighboring node.

When the current switching node is the first switching node, the first neighboring node is the first interface controller; when the current switching node is the second switching node, the second neighboring node is the second interface controller. That a transmission path for the data packet and the control packet is the switching node 1, the switching node 2 and the switching node 5 is used as an example. A first neighboring node of the switching node 1 is the interface controller 120-1 (that is, the first interface controller), and a second neighboring node is the switching node 2. A first neighboring node of the switching node 2 is the switching node 1, and a second neighboring node is the switching node 5. A first neighboring node of the switching node 5 (that is, the second switching node) is the switching node 2, and a second neighboring node is the interface controller 120-5 (that is, the second interface controller).

The second interface controller is configured to convert, when receiving the data packet sent by the second switching node, the data packet into data in an electrical signal form, and send the data in an electrical signal form to the second interconnection endpoint.

That the transmission path for the data packet and the control packet is the switching node 1, the switching node 2 and the switching node 5 is still used as an example. The switching node 5 is the second switching node, and the interface controller 120-5 connected to the switching node 5 is the second interface controller.

It should be noted that, the second interconnection endpoint may be a preset destination (that is, a destination corresponding to the destination address carried in the control packet) of the data, or may be a temporarily-determined destination of the data. For example, the preset destination of the data is a third interconnection endpoint (such as a memory 112-9). When the switching node 5 receives the control packet from the switching node 2, candidate next hops that are sequentially determined by the switching node 5 according to the routing information in the control packet are switching nodes 4, 8, and 6. However, if the switching node 5 determines that optical ports of the switching node 5 and connected to the three candidate next hops are all occupied, an optical path to the next hop node cannot be opened for the data packet corresponding to the control packet. Then, the switching node 5 opens an optical path from an optical port connected to the switching node 2 to an optical port connected to the interface controller 120-5, and when receiving the data packet using the optical port connected to the switching node 2, sends the data packet to the interface controller 120-5 (that is, the second interface controller) using the opened optical path, and the interface controller 120-5 converts the data packet into data in an electrical signal form and stores the data in a memory 112-5 (that is, the second interconnection endpoint).

If the second interconnection endpoint is not the preset destination of the data, the second interconnection endpoint (that is, a memory connected to the second interface controller) sends, when storing the data in an electrical signal form, an address for storing the data to a processor (such as all processors in the interconnection system 100) that may subsequently read the data.

In addition, when a same switching node in the interconnection system 100 is connected to multiple interconnection endpoints, the multiple interconnection endpoints may be separately connected to the switching node using different interface controllers or may be connected to the switching node using a same interface controller, and it may also be that some interconnection endpoints are connected to the switching node using an interface controller and some interconnection endpoints are connected to the switching node using another interface controller.

When the interconnection system 100 is the inter-chip interconnection system, a same switching node may be connected to multiple processors and/or multiple memories. The processors connected to the same switching node may be located in different printed circuit boards (PCBs), server chassis, or even different cabinets. The memories connected to the same switching node may also be located in different PCBs, server chassis, or even different cabinets.

When the switching node is connected to multiple processors, the multiple processors may be connected to the switching node using different interface controllers, or may be connected to the switching node using a same interface controller. When the multiple processors are connected to the switching node using the same interface controller, the interface controller and the switching node use a wavelength division multiplexing technology to transmit data between the multiple processors and the switching node using an optical waveguide between the interface controller and the switching node, and the multiple processors may be connected using electrical ports to form a subnetwork (such as a ring network), such that the multiple processors directly communicate with each other using the subnetwork.

When the switching node is connected to multiple memories, the multiple memories may be connected to the switching node using different interface controllers, or may be connected to the switching node using a same interface controller. When the multiple memories are connected to the switching node using the same interface controller, the multiple memories are connected to the switching node in a fat tree structure, where the memories are leaf nodes of the fat tree structure and the switching node is a root node of the fat tree structure.

According to the interconnection system 100 provided by Embodiment 1 of the present disclosure, to-be-transmitted data is converted into a data packet in an optical signal form for transmission, and a control packet corresponding to the data packet is transmitted in an electrical signal form. When the control packet passes through a switching node, the switching node directly determines, according to routing information in the control packet, a neighboring node that serves as a next hop, and opens, in the switching node, an optical path used to transmit the data packet. Because no optical-to-electrical or electrical-to-optical conversion needs to be performed on the control packet and the data packet during an entire transmission procedure, problems of an extra delay and power consumption caused by electrical-optical-electrical conversion can be reduced, thereby improving data transmission efficiency.

Figure 5:
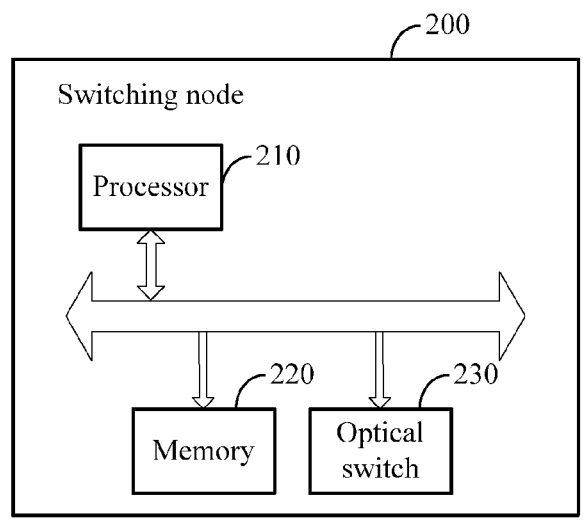
FIG. 5 is a schematic structural diagram of a switching node 200 according to Embodiment 2 of the present disclosure.

Refer to FIG. 5. Embodiment 2 of the present disclosure provides a switching node 200, including a processor 210, a memory 220, and an optical switch 230, where the processor 210, the memory 220, and the optical switch 230 may be connected by a bus.

The memory 220 is configured to store a computer operation instruction. The memory 220 may include a high-speed RAM memory, and may also include a non-volatile memory, such as at least one magnetic disk storage.

The processor 210 is configured to execute the computer operation instruction stored in the memory 220. The processor 210 may be a CPU and is a core unit of a computer.

The executing, by the processor 210, the computer operation instruction enables the switching node 200 to implement the following operations: when receiving a control packet in an electrical signal form sent by a first neighboring node, determining a second neighboring node according to routing information in the control packet. The routing information in the control packet is routing information of a data packet in an optical signal form corresponding to the control packet, the first neighboring node is a switching node adjacent to the switching node, or an interface controller connected to the switching node, and the second neighboring node is a switching node adjacent to the switching node, or an interface controller connected to the switching node; sending the control packet to the second neighboring node, and opening an optical path from a first optical port of the optical switch 230 to a second optical port of the optical switch 230. The first optical port of the optical switch 230 is connected to an optical port of the first neighboring node, and the second optical port of the optical switch 230 is connected to an optical port of the second neighboring node.

The routing information includes a destination address of the data packet, and may also include a priority and other information of the data packet.

The interconnection endpoint may be a processor or a memory.

The executing, by the processor 210, the computer operation instruction may enable the switching node 200 to implement the following operations: determining, according to the destination address, whether a destination of the data packet in an optical signal form is an interconnection endpoint connected to the switching node using an interface controller. If so, it is determined that the interface controller is the second neighboring node; otherwise, determining, according to a routing algorithm, a neighboring switching node that serves as a candidate next hop. If an optical port of the switching node and connected to the neighboring switching node that serves as the candidate next hop is not occupied, determining that the neighboring switching node is the second neighboring node. If optical ports of the switching node and connected to all neighboring switching nodes that serve as candidate next hops are all occupied, when determining that there is an idle memory connected to the switching node using an interface controller, determining that the interface controller is the second neighboring node.

The optical switch 230 is configured to, when receiving the data packet using the first optical port, transmit the data packet to the second optical port using the optical path, and send the data packet to the second neighboring node using the second optical port.

The optical switch 230 may be a switch of a type, such as microring, Mach Zehnder Interferometer (MZI), semiconductor optical amplifier (SOA), and micro electro mechanical systems (MEMS).

Figures 1, 6:
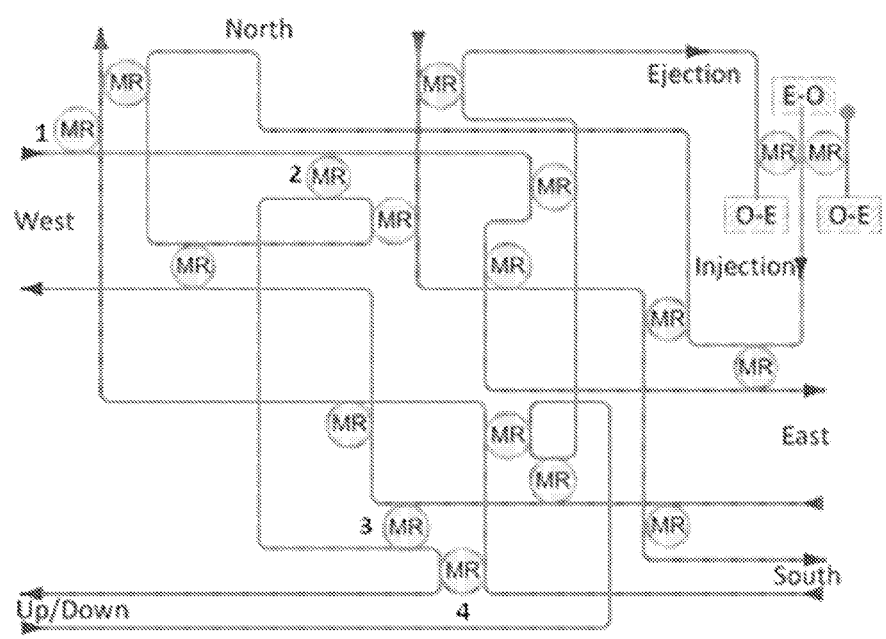

Exemplarily, as shown in FIG. 6-1, the optical switch 230 is a 6×6 bidirectional optical switch including an optical waveguide and a microring (MR shown in FIG. 6-1), where the 6×6 bidirectional optical switch has six optical ports (East, South, West, North, Ejection/Injection, and Up/Down) and all the optical ports are bidirectional.

Figures 2, 6:

FIG. 6-2 shows on/off state control of each microring, where a dotted line indicates a transmission direction when the microring is in an off state, and a solid line indicates a transmission direction when the micro ring is in an on state.

The processor 210 may control, by executing the computer operation instruction, the on/off state of each microring in the optical switch 230 to open an optical path between two ports of the optical switch 230. As shown in FIG. 6-1, opening an optical path from an optical port West to an optical port Up/Down may be implemented by closing microring No. 1, opening microring No. 2, and closing microrings No. 3 and No. 4.

Preferably, the executing, by the processor 210, the computer operation instruction may further enable the switching node 200 to implement the following operations: when receiving a packet in an electrical signal form sent by the first neighboring node, determining whether the packet in an electrical signal form is a control packet according to information that is in the packet in an electrical signal form and used to indicate a packet type, and when it is determined that the packet in an electrical signal form is a control packet, performing the operation of opening the optical path for the data packet in an optical signal form corresponding to the control packet.

The switching node 200 provided by Embodiment 2 may be any one switching node in the interconnection system 100 provided by Embodiment 1, and the any one switching node in the interconnection system 100 provided by Embodiment 1 may be implemented in the implementation manner of the switching node 200 provided by Embodiment 2.

According to the switching node 200 provided by Embodiment 2 of the present disclosure, a control packet received by the switching node is in an electrical signal form and includes routing information of a data packet in an optical signal form corresponding to the control packet; routing may be performed directly according to the routing information in the control packet to determine a neighboring node that serves as a next hop, and an optical path used to transmit the data packet in an optical signal form is opened in the switching node to transmit the data packet. Because no optical-to-electrical or electrical-to-optical conversion needs to be performed on the control packet and the data packet during an entire transmission procedure, problems of an extra delay and power consumption caused by electrical-optical-electrical conversion can be reduced, thereby improving data transmission efficiency.

Figure 7:
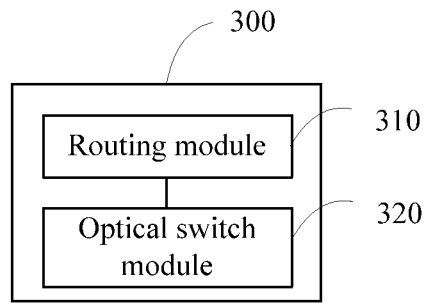
FIG. 7 is a schematic structural diagram of a switching node 300 according to Embodiment 3 of the present disclosure.

Refer to FIG. 7. Embodiment 3 of the present disclosure provides a switching node 300, including a routing module 310 and an optical switch module 320.

The routing module 310 is configured to determine, when receiving a control packet in an electrical signal form sent by a first neighboring node, a second neighboring node according to routing information in the control packet. The routing information in the control packet is routing information of a data packet in an optical signal form corresponding to the control packet, the first neighboring node is a switching node adjacent to the switching node 300 or an interface controller connected to the switching node 300, and the second neighboring node is a switching node adjacent to the switching node 300 or an interface controller connected to the switching node 300, and further configured to, when the second neighboring node is the switching node adjacent to the switching node, send the control packet to the second neighboring node, and instruct the optical switch module 320 to open an optical path from a first optical port of the switching node 300 to a second optical port of the switching node 300, for the data packet in an optical signal form corresponding to the control packet, where the first optical port of the switching node 300 is connected to an optical port of the first neighboring node, and the second optical port of the switching node 300 is connected to an optical port of the second neighboring node.

The routing information includes a destination address of the data packet, and may also include a priority and other information of the data packet.

The interconnection endpoint may be a processor or a memory.

The routing module 310 may determine, according to the destination address, whether a destination of the data packet in an optical signal form is an interconnection endpoint connected to the switching node using an interface controller. If so, determine that the interface controller is the second neighboring node; otherwise, determine, according to a routing algorithm, a neighboring switching node that serves as a candidate next hop. If an optical port of the switching node and connected to the neighboring switching node that serves as the candidate next hop is not occupied, determine that the neighboring switching node is the second neighboring node. If optical ports of the switching node and connected to all neighboring switching nodes that serve as candidate next hops are all occupied, when it is determined that there is an idle memory connected to the switching node using an interface controller, determine that the interface controller is the second neighboring node.

The optical switch module 320 is configured to open the optical path, according to an instruction of the routing module 310, and configured to, when receiving the data packet using the first optical port, transmit the data packet to the second optical port using the optical path, and send the data packet to the second neighboring node using the second optical port.

The routing module 310 may be further configured to, when receiving a packet in an electrical signal form sent by the first neighboring node, determine whether the packet in an electrical signal form is a control packet according to information that is in the packet in an electrical signal form and used to indicate a packet type, and when it is determined that the packet in an electrical signal form is a control packet, instruct the optical switch module 320 to open the optical path for the data packet in an optical signal form corresponding to the control packet.

The switching node 300 provided by Embodiment 3 may be any one switching node in the interconnection system 100 provided by Embodiment 1, and the any one switching node in the interconnection system 100 provided by Embodiment 1 may be implemented in the implementation manner of the switching node 300 provided by Embodiment 3.

According to the switching node 300 provided by Embodiment 3 of the present disclosure, a control packet received by the switching node is in an electrical signal form and includes routing information of a data packet in an optical signal form corresponding to the control packet. Routing may be performed directly according to the routing information in the control packet to determine a neighboring node that serves as a next hop, and an optical path used to transmit the data packet in an optical signal form is opened in the switching node to transmit the data packet. Because no optical-to-electrical or electrical-to-optical conversion needs to be performed on the control packet and the data packet during an entire transmission procedure, problems of an extra delay and power consumption caused by electrical-optical-electrical conversion can be reduced, thereby improving data transmission efficiency.

Figure 8:
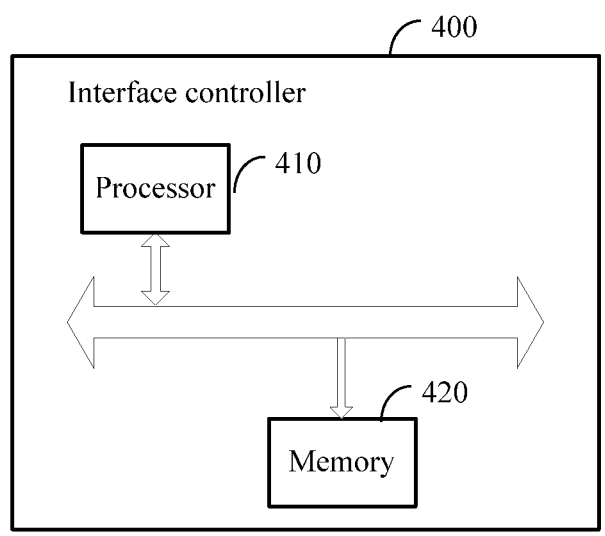
FIG. 8 is a schematic structural diagram of an interface controller 400 according to Embodiment 4 of the present disclosure.

Refer to FIG. 8. Embodiment 4 of the present disclosure provides an interface controller 400, including a processor 410 and a memory 420, where the processor 410 and the memory 420 are connected by a bus.

The memory 420 is configured to store a computer operation instruction. The memory 420 may include a high-speed RAM memory, and may also include a non-volatile memory, such as at least one magnetic disk storage.

The processor 410 is configured to execute the computer operation instruction stored in the memory 420. The processor 410 may be a CPU and is a core unit of a computer.

The executing, by the processor 410, the computer operation instruction enables the interface controller 400 to implement the following operations: when receiving data in an electrical signal form sent by an interconnection endpoint connected to the interface controller, converting the data into a data packet in an optical signal form, and generating a control packet for the data packet, where the control packet is in an electrical signal form and includes routing information of the data packet. Sending the control packet to a switching node connected to the interface controller, and sending the data packet to the switching node after an offset time, such that when receiving the control packet and determining a next hop according to the routing information of the data packet included in the control packet, the switching node opens, in the switching node, an optical path that is from an optical port connected to the interface controller to an optical port connected to the next hop and that is used to transmit the data packet, and when receiving the data packet in an optical signal form, transmits the data packet in an optical signal form using the optical path.

Preferably, the executing, by the processor 410, the computer operation instruction may enable the interface controller 400 to implement the following operation: when determining that the data in an electrical signal form meets a preset condition, performing the operation of converting the data into the data packet in an optical signal form and generating the control packet.

The determining that the data in an electrical signal form meets a preset condition includes determining that a type of the data in an electrical signal form is a preset type, or determining that the data in an electrical signal form is greater than a preset threshold, or determining that a type of the data in an electrical signal form is a preset type and the data in an electrical signal form is greater than a preset threshold.

The interface controller 400 provided by Embodiment 4 may be any one interface controller in the interconnection system 100 provided by Embodiment 1, and the any one interface controller in the interconnection system 100 provided by Embodiment 1 may be implemented in the implementation manner of the interface controller 400 provided by Embodiment 4.

According to the interface controller 400 provided by Embodiment 4 of the present disclosure, the interface controller converts data in an electrical signal form sent by an interconnection endpoint into a data packet in an optical signal form, generates a control packet in an electrical signal form that includes routing information of the data packet, sends the control packet to a switching node, and sends the data packet in an optical signal form to the switching node after an offset time. Therefore, the switching node may perform routing directly according to the routing information in the control packet to determine a next hop, and open, in the switching node, an optical path used to transmit the data packet for transmitting the data packet. Because no optical-to-electrical or electrical-to-optical conversion needs to be performed on the control packet and the data packet during an entire transmission procedure, problems of an extra delay and power consumption caused by electrical-optical-electrical conversion can be reduced, thereby improving data transmission efficiency.

Figure 9:
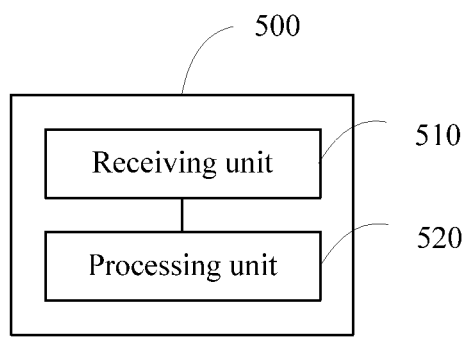
FIG. 9 is a schematic structural diagram of an interface controller 500 according to Embodiment 5 of the present disclosure.

Refer to FIG. 9. Embodiment 5 of the present disclosure provides an interface controller 500, including a receiving unit 510 and a processing unit 520.

The receiving unit 510 is configured to receive data in an electrical signal form sent by an interconnection endpoint connected to the interface controller, and transmit the received data to the processing unit 520, where the interconnection endpoint may be a processor or a memory.

The processing unit 520 is configured to receive the data from the receiving unit 510, convert the data into a data packet in an optical signal form, and generate a control packet for the data packet, where the control packet is in an electrical signal form and includes routing information of the data packet, and further configured to send the control packet to a switching node connected to the interface controller, and send the data packet to the switching node after an offset time, such that when receiving the control packet and determining a next hop according to the routing information of the data packet included in the control packet, the switching node opens, in the switching node, an optical path that is from an optical port connected to the interface controller to an optical port connected to the next hop and that is used to transmit the data packet, and when receiving the data packet in an optical signal form, transmits the data packet in an optical signal form using the optical path.

The processing unit 520 may be configured to, when determining that the data in an electrical signal form meets a preset condition, for example, determining that a type of the data in an electrical signal form is a preset type, or determining that the data in an electrical signal form is greater than a preset threshold, or determining that a type of the data in an electrical signal form is a preset type and the data in an electrical signal form is greater than a preset threshold, perform the operation of converting the data into a data packet in an optical signal form and generating a control packet. In addition, the processing unit 520 may be further configured to, when determining that the data does not meet the preset condition, directly transmit the data to the switching node using an electrical interconnection cable connected to the switching node.

The interface controller 500 provided by Embodiment 5 may be any one interface controller in the interconnection system 100 provided by Embodiment 1, and the any one interface controller in the interconnection system 100 provided by Embodiment 1 may be implemented in the implementation manner of the interface controller 500 provided by Embodiment 5.

According to the interface controller 500 provided by Embodiment 5 of the present disclosure, the interface controller converts data in an electrical signal form sent by an interconnection endpoint into a data packet in an optical signal form, generates a control packet in an electrical signal form that includes routing information of the data packet, sends the control packet to a switching node, and sends the data packet in an optical signal form to the switching node after an offset time. Therefore, the switching node may perform routing directly according to the routing information in the control packet to determine a next hop, and open, in the switching node, an optical path used to transmit the data packet for transmitting the data packet. Because no optical-to-electrical or electrical-to-optical conversion needs to be performed on the control packet and the data packet during an entire transmission procedure, problems of an extra delay and power consumption caused by electrical-optical-electrical conversion can be reduced, thereby improving data transmission efficiency.

Figure 10:
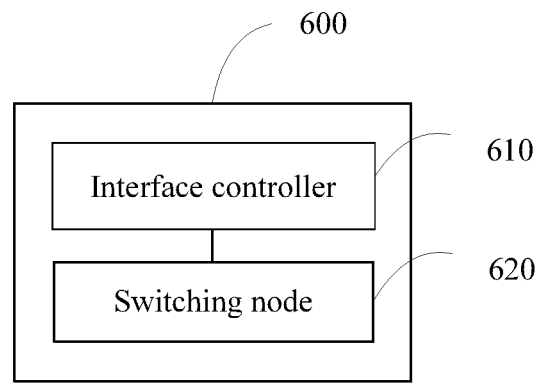
FIG. 10 is a schematic structural diagram of an access switching node 600 according to Embodiment 6 of the present disclosure.

Refer to FIG. 10. Embodiment 6 of the present disclosure provides an access switching node 600. The access switching node 600 includes an interface controller 610 and a switching node 620, where the interface controller 610 is the interface controller 400 provided by Embodiment 4 or the interface controller 500 provided by Embodiment 5, and the switching node 620 is the switching node 200 provided by Embodiment 2 or the switching node 300 provided by Embodiment 3.

Figure 11:
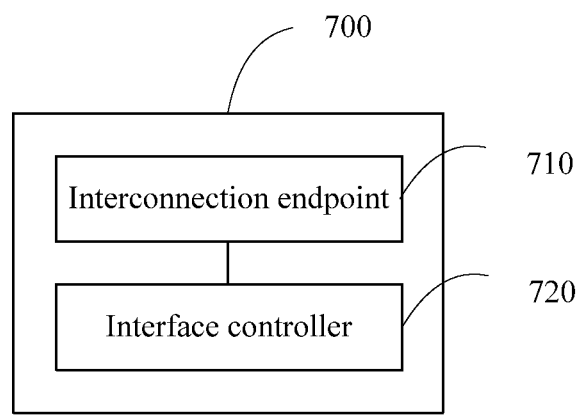
FIG. 11 is a schematic structural diagram of an access interconnection endpoint 700 according to Embodiment 7 of the present disclosure.

Refer to FIG. 11. Embodiment 7 of the present disclosure provides an access interconnection endpoint 700, including an interconnection endpoint 710 and an interface controller 720, where the interconnection endpoint 710 may be any one interconnection endpoint (such as the first interconnection endpoint) in the interconnection system 100 provided by Embodiment 1, and the interface controller 720 is the interface controller 400 provided by Embodiment 4 or the interface controller 500 provided by Embodiment 5.

Figure 12:
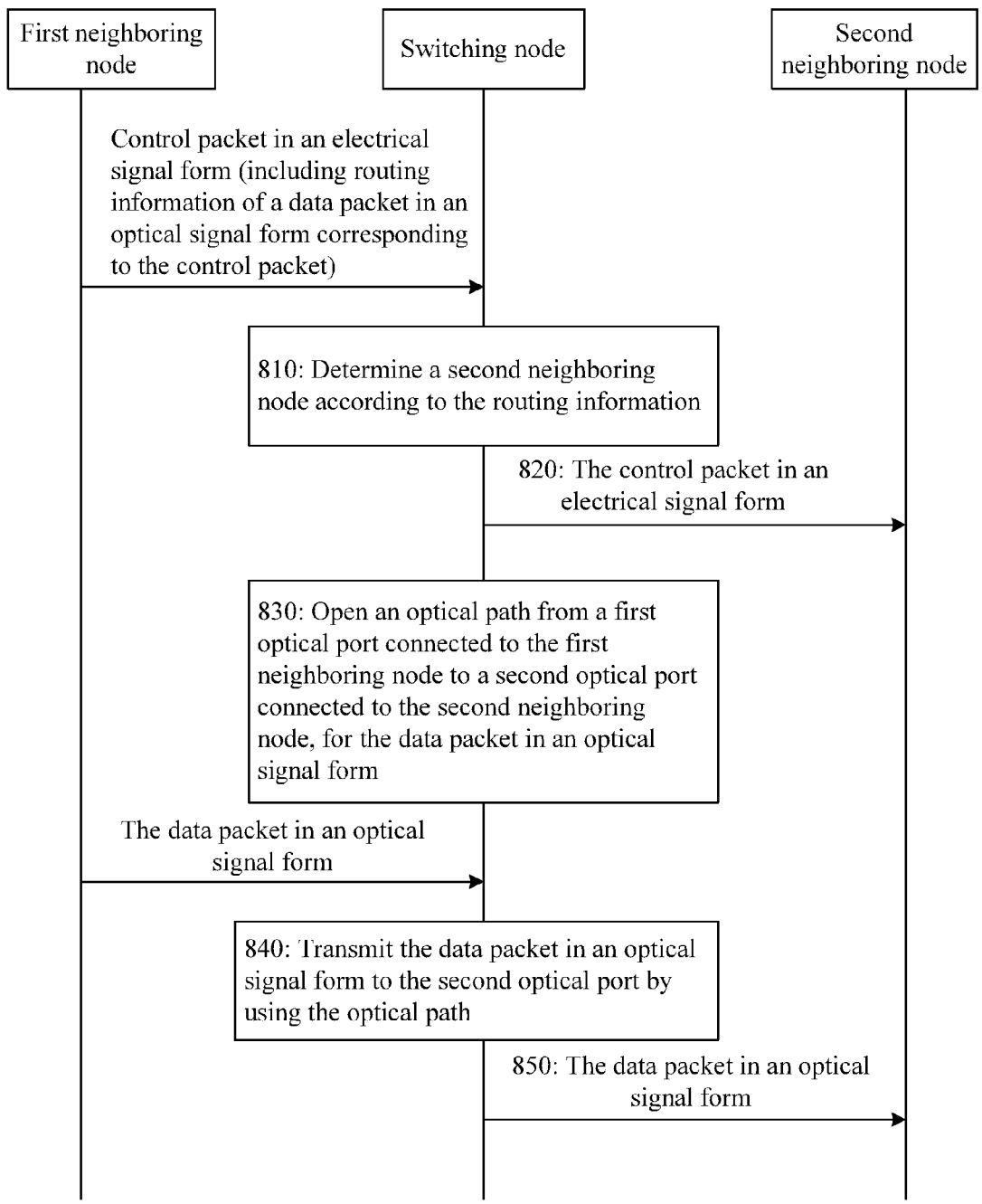
FIG. 12 is an interaction flowchart of a data transmission method according to Embodiment 8 of the present disclosure.

Refer to FIG. 12. Embodiment 8 of the present disclosure provides a data transmission method, including the following steps.

Step 810: When receiving a control packet in an electrical signal form sent by a first neighboring node, a switching node determines a second neighboring node according to routing information in the control packet, where the routing information in the control packet is routing information of a data packet in an optical signal form corresponding to the control packet, the first neighboring node is a switching node adjacent to the switching node, or an interface controller connected to the switching node, and the second neighboring node is a switching node adjacent to the switching node, or an interface controller connected to the switching node.

Step 820: The switching node sends the control packet to the second neighboring node when the second neighboring node is the switching node adjacent to the switching node.

Step 830: The switching node opens, in the switching node, an optical path from a first optical port connected to the first neighboring node to a second optical port connected to the second neighboring node, for the data packet corresponding to the control packet.

Step 840: When receiving the data packet using the first optical port, the first switching node transmits the data packet to the second optical port using the optical path.

Step 850: Send the data packet to the second neighboring node using the second optical port.

Preferably, the method further includes, when receiving a packet in an electrical signal form sent by the first neighboring node, determining whether the packet in an electrical signal form is a control packet by the switching node according to information that is in the packet in an electrical signal form and used to indicate a packet type, and when it is determined that the packet in an electrical signal form is a control packet, performing the operation of opening the optical path for the data packet in an optical signal form corresponding to the control packet.

An implementation of step 810 may be determining whether a destination of the data packet corresponding to the control packet is an interconnection endpoint connected to the switching node using an interface controller. If so, it is determined that the interface controller is the second neighboring node; otherwise, determining, according to a routing algorithm, a neighboring switching node that serves as a candidate next hop. If an optical port of the switching node and connected to the neighboring switching node that serves as the candidate next hop is not occupied, determining that the neighboring switching node is the second neighboring node. If optical ports of the switching node and connected to all neighboring switching nodes that serve as candidate next hops are all occupied, when it is determined that there is an idle memory connected to the switching node using an interface controller, determining that the interface controller is the second neighboring node.

The data transmission method provided by Embodiment 8 of the present disclosure may be executed by any one switching node in the interconnection system provided by Embodiment 1.

According to the data transmission method provided by Embodiment 8 of the present disclosure, a control packet received by a switching node is in an electrical signal form and includes routing information of a data packet in an optical signal form corresponding to the control packet; routing may be performed directly according to the routing information in the control packet to determine a neighboring node that serves as a next hop, and an optical path used to transmit the data packet in an optical signal form is opened in the switching node to transmit the data packet. Because no optical-to-electrical or electrical-to-optical conversion needs to be performed on the control packet and the data packet during an entire transmission procedure, problems of an extra delay and power consumption caused by electrical-optical-electrical conversion can be reduced, thereby improving data transmission efficiency.

Figure 13:
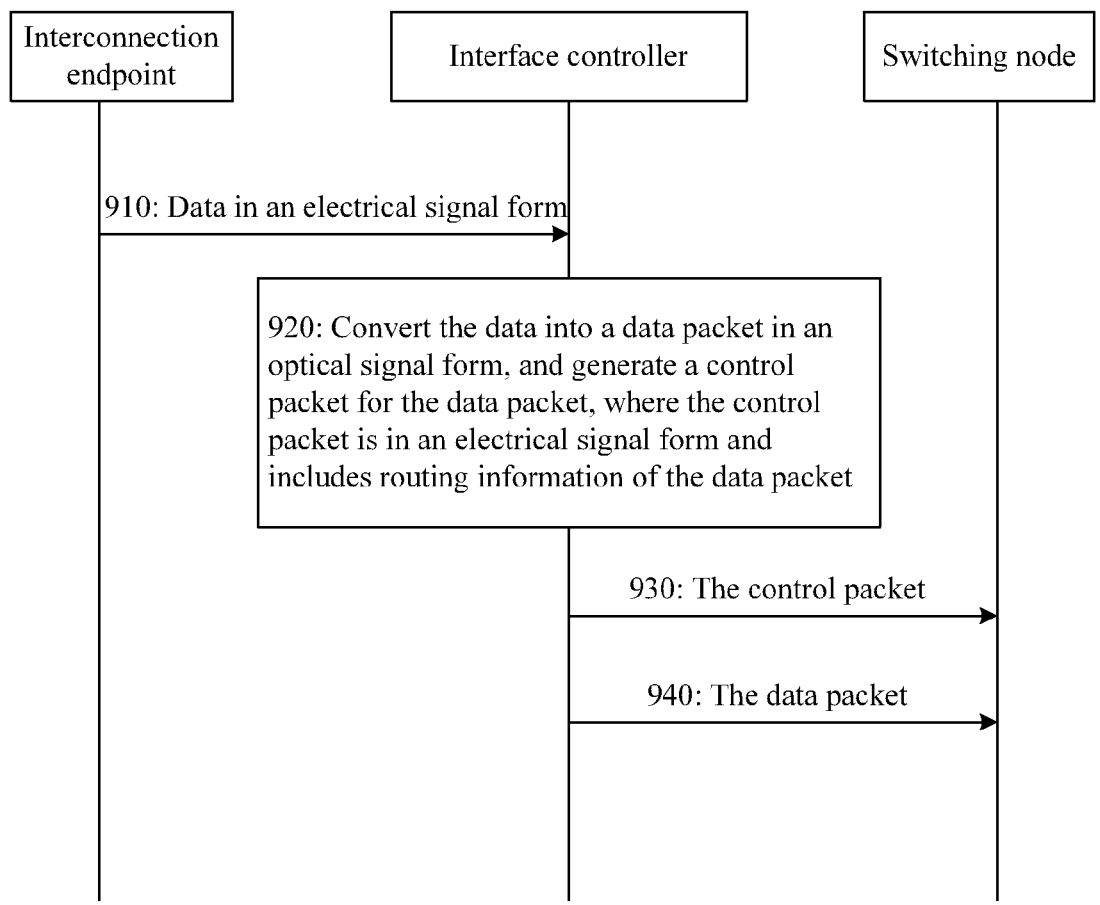
FIG. 13 is an interaction flowchart of a data transmission method according to Embodiment 9 of the present disclosure.

Refer to FIG. 13. Embodiment 9 of the present provides a data transmission method, including the following steps.

Step 910: An interface controller receives data in an electrical signal form sent by the interconnection endpoint, where the interconnection endpoint may be a processor or a memory.

Step 920: The interface controller converts the data into a data packet in an optical signal form, and generates a control packet for the data packet, where the control packet is in an electrical signal form and includes routing information of the data packet.

Step 930: The interface controller sends the control packet to the switching node, and (Step 940) sends the data packet to the switching node after an offset time, such that when receiving the control packet and determining a next hop according to the routing information of the data packet included in the control packet, the switching node opens, in the switching node, an optical path that is from an optical port connected to the interface controller to an optical port connected to the next hop and that is used to transmit the data packet, and when receiving the data packet in an optical signal form, transmits the data packet in an optical signal form using the optical path.

Preferably, in step 920, when determining that the data in an electrical signal form meets a preset condition, for example, determining that a type of the data in an electrical signal form is a preset type, or determining that the data in an electrical signal form is greater than a preset threshold, or determining that a type of the data in an electrical signal form is a preset type and the data is greater than a preset threshold, the interface controller performs the operation of converting the data into a data packet in an optical signal form and generating a control packet.

The data transmission method provided by Embodiment 9 of the present disclosure may be implemented by any one interface controller in the interconnection system provided by Embodiment 1.

According to the data transmission method provided by Embodiment 9 of the present disclosure, an interface controller converts data in an electrical signal form sent by an interconnection endpoint into a data packet in an optical signal form, generates a control packet in an electrical signal form that includes routing information of the data packet, sends the control packet to a switching node, and sends the data packet in an optical signal form to the switching node after an offset time. Therefore, the switching node may perform routing directly according to the routing information in the control packet to determine a next hop, and open, in the switching node, an optical path used to transmit the data packet for transmitting the data packet. Because no optical-to-electrical or electrical-to-optical conversion needs to be performed on the control packet and the data packet during an entire transmission procedure, problems of an extra delay and power consumption caused by electrical-optical-electrical conversion can be reduced, thereby improving data transmission efficiency.

A person of ordinary skill in the art may understand that all or some of the steps of the embodiments may be implemented by hardware or a program instructing related hardware. The program may be stored in a computer-readable storage medium. The storage medium may include a read-only memory, a magnetic disk, or an optical disc.

The foregoing descriptions are merely exemplary embodiments of the present disclosure, but are not intended to limit the present disclosure. Any modification, equivalent replacement, and improvement made without departing from the spirit and principle of the present disclosure shall fall within the protection scope of the present disclosure.

What is claimed is:

1. An interconnection system, comprising:
 a first interconnection endpoint and a second interconnection endpoint;
 a first interface controller and a second interface controller; and
 one or more switching nodes,
 wherein the first interconnection endpoint and a first switching node are connected to the first interface controller,
 wherein the second interconnection endpoint and a second switching node are connected to the second interface controller, wherein the first interconnection endpoint is configured to send data in an electrical signal form to the first interface controller, wherein the first interface controller is configured to:
- determine whether the data in the electrical signal form meets a preset condition;
- convert the data in the electrical signal form into a data packet in an optical signal form when the data in the electrical signal form meets the preset condition, and generate a control packet for the data packet, wherein the control packet is in an electrical signal form and comprises routing information of the data packet;
- send the control packet to the first switching node;
- send the data packet to the first switching node after an offset time, wherein each of the one or more switching nodes is configured to determine, when receiving the control packet sent by a previous hop node, a next hop node according to the routing information of the data packet;
- open an optical path for the data packet from a first optical port connected to the previous hop node to a second optical port connected to the next hop node;
- transmit the data packet using the optical path to the second optical when receiving the data packet using the first optical port; and
- send the data packet to the next hop node using the second optical port when receiving the data packet using the first optical port, wherein the previous hop node is a switching node connected to the first optical port or the first interconnection endpoint, wherein the next hop node is a switching node connected to the second optical port or the second interconnection endpoint, and wherein the second interface controller is configured to:
- convert the data packet into the data in the electrical signal form when receiving the data packet sent by the second switching node; and
- send the data in the electrical signal form to the second interconnection endpoint.

2. The interconnection system according to claim 1, wherein determining that the data in the electrical signal form meets the preset condition comprises determining that a type of the data in the electrical signal form is a preset type.

3. The interconnection system according to claim 1, wherein determining that the data in the electrical signal form meets the preset condition comprises determining that the data in the electrical signal form is greater than a preset threshold.

4. The interconnection system according to claim 1, wherein determining that the data in the electrical signal form meets the preset condition comprises determining that the type of the data in an electrical signal form is a preset type and the data in the electrical signal form is greater than a preset threshold.

5. The interconnection system according to claim 1, wherein each of the one or more switching nodes is further configured to
- determine whether the control packet in the electrical signal form is a control packet according to information that is in the control packet in the electrical signal form and used to indicate a packet type when receiving the control packet in the electrical signal form sent by the previous hop node.

6. The interconnection system according to claim 1, wherein the first interconnection endpoint and the second interconnection endpoint are a processor or a memory.

7. The interconnection system according to claim 6, wherein the routing information of the data packet comprises a destination address of the data packet, and wherein determining the next hop node according to the routing information of the data packet comprises:
- determining, according to the destination address, whether a destination of the data packet is the second interconnection endpoint;
- determining that the second interface controller is the next hop node when the destination of the data packet is the second interconnection endpoint; and
- determining, according to a routing algorithm, the switching node connected to the second optical port as a candidate next hop node when the destination of the data packet is not the second interconnection endpoint; and
- determining that the candidate next hop node is the next hop node when the second optical port connected to the candidate next hop node is not occupied.

8. An interface controller, comprising:
- a processor; and
- a memory configured to store a computer operation instruction, wherein the processor is coupled to the memory and configured to execute the computer operation instruction stored in the memory to enable the interface controller to:
  - receive data in an electrical signal form an interconnection endpoint;
  - determine whether the data in the electrical signal form meets a preset condition;
  - convert the data into a data packet in an optical signal form when the data in the electrical signal form meets the preset condition;
  - generate a control packet for the data packet, wherein the control packet is in an electrical signal form and comprises routing information of the data packet;
  - send the control packet to a switching node connected to the interface controller; and
  - send the data packet to the switching node after an offset time, such that when receiving the control packet and determining a next hop according to the routing information of the data packet comprised in the control packet, the switching node opens, in the switching node, an optical path that is from an optical port connected to the interface controller to an optical port connected to the next hop and that is used to transmit the data packet, and such that, when receiving the data packet in the optical signal form, the switching node transmits the data packet in the optical signal form using the optical path.

9. The interface controller according to claim 8, wherein executing, by the processor, the computer operation instruction enables the interface controller to convert the data into the data packet in the optical signal form and generate the control packet when determining at least one of that a type of the data in the electrical signal form is a preset type, that the data in the electrical signal form is greater than a preset threshold, and that a type of the data in the electrical signal form is the preset type and the data in the electrical signal form is greater than the preset threshold.

10. A data transmission method, comprising:
- receiving, by an interface controller, data in an electrical signal form sent by an interconnection endpoint connected to the interface controller;

determining whether the data in the electrical signal form meets a preset condition;

converting, by the interface controller, the data into a data packet in an optical signal form when the data in the electrical signal form meets the preset condition;

generating a control packet for the data packet, wherein the control packet is in an electrical signal form and comprises routing information of the data packet;

sending, by the interface controller, the control packet to a switching node connected to the interface controller; and sending the data packet to the switching node after an offset time, such that the switching node opens an optical path that is from an optical port connected to the interface controller to an optical port connected to a next hop node and that is used to transmit the data packet when receiving the control packet and determining the next hop node according to the routing information of the data packet comprised in the control packet, and such that the switching node transmits the data packet in the optical signal form using the optical path when receiving the data packet in the optical signal form.

11. The method according to claim 10, wherein determining that the data in the electrical signal form meets the preset condition comprises determining at least one of that a type of the data in the electrical signal form is a preset type, that the data in the electrical signal form is greater than a preset threshold, and that a type of the data in the electrical signal form is the preset type and the data in the electrical signal form greater than the preset threshold.

* * * * *

UNITED STATES PATENT AND TRADEMARK OFFICE
CERTIFICATE OF CORRECTION

PATENT NO.         : 9,712,901 B2
APPLICATION NO.    : 14/928661
DATED              : July 18, 2017
INVENTOR(S)        : Xuecang Zhang, Quinfen Hao and Yaoda Liu Page 1 of 1

It is certified that error appears in the above-identified patent and that said Letters Patent is hereby corrected as shown below:

In the Claims

Column 23, Line 26-27, Claim 1 should read:
second optical port when receiving the data packet using the first optical port; and Column 24, Line 30-31, Claim 8 should read:
receive data in an electrical signal form from an interconnection endpoint;

Signed and Sealed this
Twenty-sixth Day of September, 2017

Joseph Matal
*Performing the Functions and Duties of the*
*Under Secretary of Commerce for Intellectual Property and*
*Director of the United States Patent and Trademark Office*